May 29, 1956 R. E. BERT ET AL 2,747,357
ADJUSTABLE REEL FOR CROP HANDLING IMPLEMENT
Filed Oct. 13, 1952 2 Sheets-Sheet 1

INVENTORS.
Raymond E. Bert
Joseph L. Wetta
BY
ATTORNEY.

INVENTORS.
Raymond E. Bert
Joseph L. Wetta
BY
ATTORNEY.

United States Patent Office 2,747,357
Patented May 29, 1956

2,747,357

ADJUSTABLE REEL FOR CROP HANDLING IMPLEMENT

Raymond E. Bert and Joseph L. Wetta, Maize, Kans.

Application October 13, 1952, Serial No. 314,428

2 Claims. (Cl. 56—221)

This invention relates to farm implements of the kind used to harvest crops and more particularly to a cutting implement adapted primarily to cut hay crops, chop the same into small fragments and deposit the chopped material in a trailer or other container therefor.

This invention has to do with the subject matter of United States Letters Patent No. 2,554,195, of May 22, 1951, and has for its primary object to provide improvements in the crop handling implement therein disclosed.

We have found after many years of producing and operating the implement of the aforementioned patent, that the same is capable of operation precisely as therein disclosed and that it is highly efficient for many types of crops, notwithstanding the condition thereof at the time of cutting. It has been found however, that the speed of operation thereof can be appreciably increased and the implement rendered more universally adaptable for handling crops that have become flattened to the ground or adjacent thereto through use of the improvements hereinafter set forth.

It is the most important object of the present invention therefore, to provide a crop handling implement of the kind disclosed in said patent, but including a rotatable reel disposed forwardly of the rotating drum for picking up or elevating the crop to a substantially upright position where the same can be and is cut by the cutter bar next adjacent the rotatable drum.

It is another object hereof to provide means for readily adjusting the rotatable drum such as that disclosed in said patent to the end that the crop is held in an upright condition on a platform and against the auger as such crop moves along the platform.

A still further object hereof is to provide a reel that is adjustable with respect to the shiftable drum to the end that virtually all classes of crops such as alfalfa, clover and other hay products can be handled by the implement notwithstanding the condition thereof at the time of cutting.

Additional objects include important details of construction, all of which will be made clear or become apparent as the following specification progresses, reference being had to the accompanying drawings, wherein.

Figure 1:
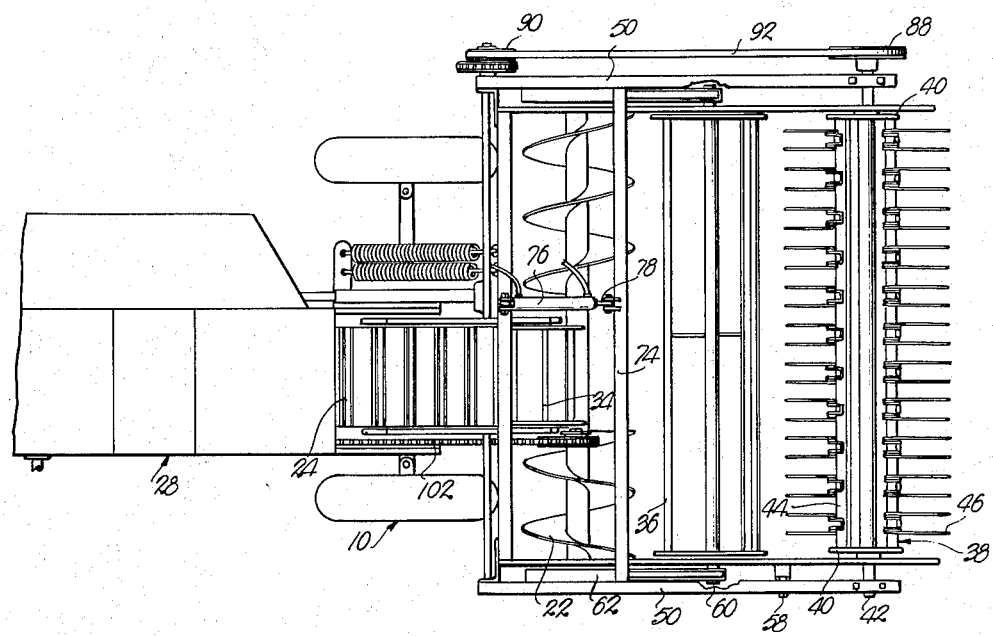
Figure 1 is a fragmentary, top plan view of a crop handling implement having a plurality of cooperating rotors made according to the present invention, parts being broken away for clarity.
Figure 2:
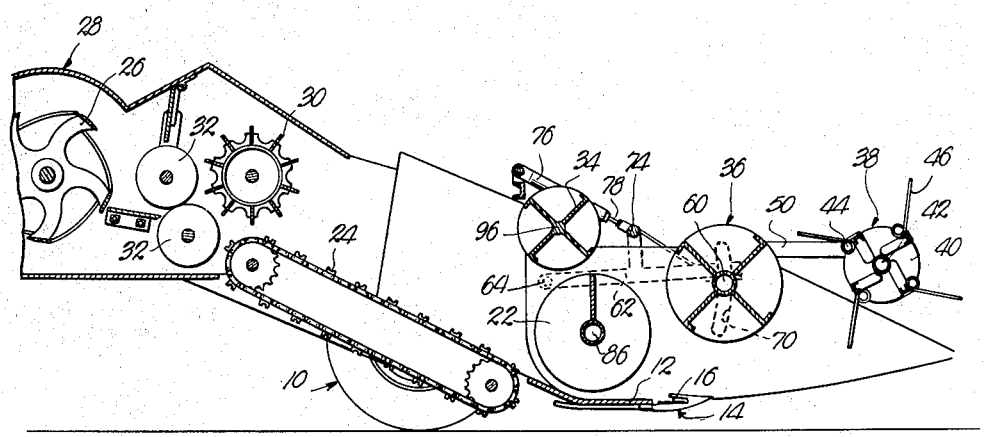
Fig. 2 is a vertical, substantially central, fragmentary, cross-sectional view therethrough.
Figure 3:
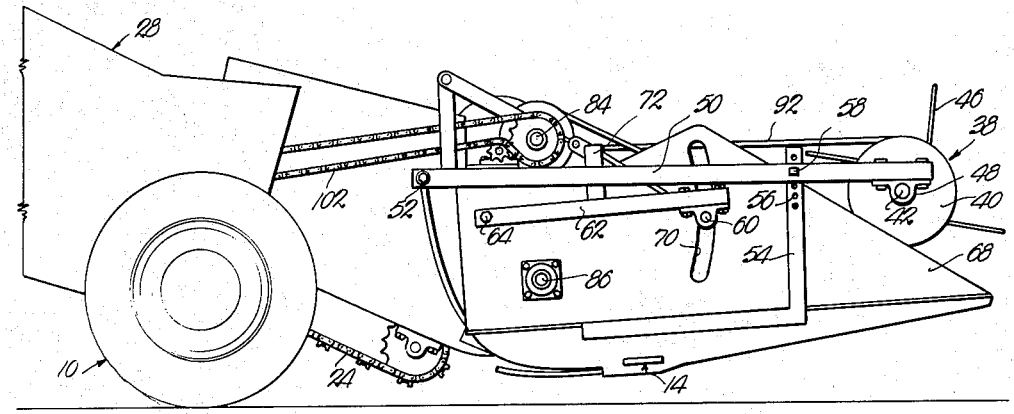
Fig. 3 is a fragmentary, enlarged, elevational view showing one side thereof.

For the most part hay crops such as alfalfa, are easily cut and gathered for the reason that the same are relatively short and usually stand in an upright condition in the field. However, depending upon the extent of rainfall and irrigation, such crops oftentimes tend to fall to the ground in a matted, tangled condition prior to cutting. Weather conditions also have such deleterious effects upon the crop, and wind, hail and other storms quite frequently force the owner to abandon the crop for lack of facilities to gather the same. Heavy, tangled, rather tall crops cause many additional difficulties in the operation of the harvesting implements, and, as will hereinafter appear, all of these problems are adequately met through employment of the improvements of the present invention.

While the implement forming the subject matter of this application is designed for self-propelled operation as distinguished from that of the above-mentioned patent, such differences have no bearing upon the principles and, therefore, the means of motivation, as well as the driving assembly, are not herein illustrated. The entire front end assembly illustrated in the drawings is supported by a single wheel and axle assembly 10, and extends forwardly thereof. There is provided a substantially horizontal platform 12 and a cutter bar 14 is mounted on or adjacent to the platform 12 at the forwardmost longitudinal edge of platform 12.

Cutter bar 14 is provided with a conventional reciprocable sickle 16 that is driven by an elongated arm 18 (Fig. 4) pivotally coupled therewith and swingable on vertical axis 20. The means for imparting swinging movement to the arm 18 forms no part of this invention and is not herein detailed. An elongated, two-way auger 22 is mounted by a shaft 86 for rotation directly above the platform 12 on a horizontal axis parallel with the longitudinal axis of the platform 12 for moving the cut crop in opposite directions toward the center of platform 12 in the same manner as described in the said Patent No. 2,554,195. The crop is received by a continuous conveyor 24 with the stems of the crop in parallelism and delivered to a rotatable cutter 26 forming a part of a chopper unit 28 which may be of conventional construction. A rotatable packer 30 and a pair of opposed rollers 32 cooperate in moving the stems to the cutter 26 for chopping into short lengths of equal size. Another packer drum 34 is disposed above the conveyor 24 and adjacent the auger 22 to further aid in moving the cut crop toward the cutter 26.

In accordance with the present invention, a rotatable drum 36, which may be much like that shown in said patent, is mounted for rotation in parallelism with the axes of rotation of auger 22 and the packer drum 34. Furthermore, there is herein provided a rotatable reel 38 mounted to rotate on a horizontal axis that is parallel with the axes of rotation of auger 22 and drum 36. All of the aforementioned rotatable axes are in substantial parallelism with the rectilinear reciprocation of sickle 16.

The reel 38 is composed of a pair of end plates 40, an axle 42 and a plurality of rods 44 mounted for rotation on the plates 40 with the shaft 42 in spaced parallelism to the latter. Each of the rods 44 carries a plurality of spaced-apart, substantially radial, outwardly extending, resilient fingers 46. The shaft 42 of the reel 38 is rotatably supported within bearings 48, carried by a pair of relatively long arms 50, each pivotally mounted as at 52 rearwardly of the auger 22. Each arm 50 is in turn supported intermediate the ends thereof by a bracket 54 having a plurality of openings 56 therein for adjustably receiving a bolt or other fastening element 58. Accordingly, the reel 38 is swingable on the horizontal axes 52 toward and away from the ground and therefore, toward and away from the cutter bar 14 with respect to the drum 36.

Drum 36 has a central shaft 60 that is rotatably carried by a pair of spaced arms 62, arms 62 each being in turn mounted for swinging movement on a horizontal axis 64 which is disposed preferably above and rearwardly of the auger 22. A pair of opposed, forwardly extending gathering shields 66 and 68 are each provided with an elongated slot 70 concentric with axes 64 for clearing the shaft 60 of drum 36.

Each arm 62 is in turn provided with an up-turned extension 72 and the extensions 72 are joined by a relatively long bar 74 above the auger 22. A pivotally mounted hydraulic piston 76 has a reciprocable valve stem 78 pivotally secured to the bar 74 intermediate the ends of the latter. Fluid control means, not herein shown, is provided to control the operation of the stem 78 to thereby raise and lower the bar 74 and accordingly, the drum 36.

Figure 4:
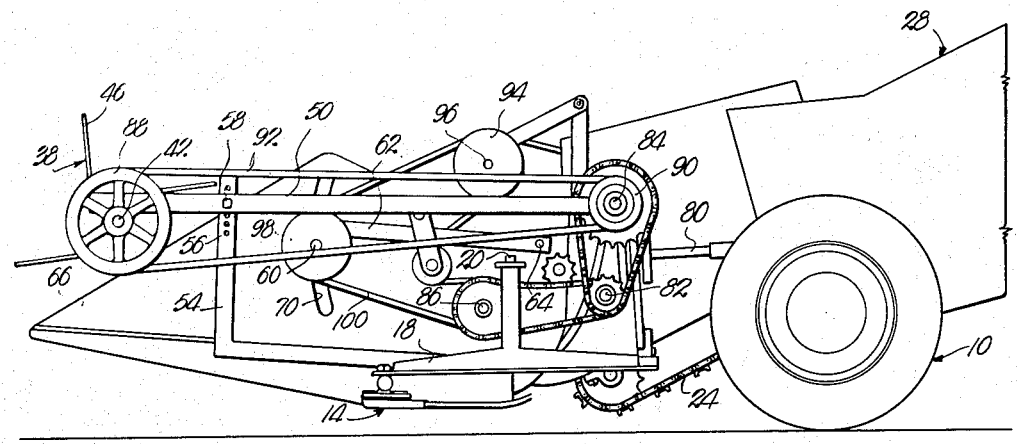
Fig. 4 is a fragmentary, enlarged, elevational view showing the opposite side thereof.

The entire assembly, including cutter bar 14, reel 38, drum 36, auger 22 and packer 34, are preferably mounted as a unit for swinging movement not only toward and away from the ground to determine the height of the sickle 16, but on a horizontal axis intersecting the axes of the last-mentioned rotatable elements in the manner provided for by our Patent No. 2,596,641, dated May 13, 1952. It is also to be preferred that the prime mover for driving the sickle 16 through the arm 18, be coupled to operate the conveyor 24, as well as all of the rotative elements, and to this end there is shown in Fig. 4, a shaft 80 having universal joints (not shown) therein and operably coupled with the arm 18. Shaft 80 is also operably coupled (by means not illustrated in detail) with a shaft 82 from which is driven an idler shaft 84 and shaft 86 for auger 22. Pulleys 88 and 90 on shafts 42 and 84 respectively, are joined by continuous belt 92 to provide a drive for the reel 38. It is to be noted that the swinging axis 52 for the reel 38, is coincident with the axis of rotation of shaft 84.

A pulley 94 on shaft 96 for packer drum 34, and a pulley 98 on the shaft 60 for drum 36, are operably coupled with the auger shaft 86 by means of a continuous belt 100 so as to permit swinging movement of the drum 36 on the axes 64. The conveyor 24 is driven from the shaft 84 by a continuous chain 102. With the reel 38 and the drum 36 properly positioned with respect to height and relative to the auger 22 depending upon the type of foliage and the condition of the crop being cut, the fingers 46 of the reel 38 will effectively comb the crop to straighten the same and raise it from a matted, down-trodden condition, holding the stems in a substantially upright condition as they are cut by the reciprocating sickle 16. The drum 36 not only cooperates with the reel 38 in assuring that the upright stems are moved into the sickle 16 between the guards of the cutter bar 14, but continue to act upon the crop after severance to hold the same against the leading face of the continuously rotating auger 22. The stems rest upon the platform 12 in an upright condition and move therealong toward the center of the auger 22 between the drum 36 and the auger 22 until that point of the auger 22 is reached, which is devoid of convolutions, whereupon the crop moves immediately beneath the auger 22 and transversely of the platform 12 to the conveyor 24. The base ends of the cut stems slide along the platform 12 and proceed up the conveyor 24 with all of the stems in substantial parallelism as they reach the cutter 26. If the crop is tall and mangled only at the top thereof, then both the reel 38 and the drum 36 may be elevated toward the uppermost end of their swinging paths of travel. If the crop is tall and mangled throughout close to the ground, then the drum 36 is raised, but the reel 38 is disposed near the lowermost end of its path of travel to pick the crop up and straighten the same out before being acted upon by the sickle 16. It is seen that the reel 38 and the drum 36 are adjustable not only with respect to the auger 22 and the sickle bar 14, but with respect to each other, and that therefore, virtually any condition may be coped with through use of the improvements hereof.

It is usually unnecessary to make many adjustments in the reel 38, but since drum 36 must be raised and lowered periodically while cutting takes place, the provision of the hydraulic piston 76 with its reciprocable stem 78, facilitates such quick adjustment.

Having thus described the invention, what is claimed as new and desired to be secured by Letters Patent is:

1. In a crop handling implement, a rotatable, pick-up, reel assembly comprising a rotatable, elongated axle; a pair of spaced, circular, end plates rigidly mounted on the axle adjacent its ends; a plurality of elongated rods extending between and rigidly interconnecting said plates, said rods being disposed in a circle about said axle in parallelism with each other and the axle; and a plurality of elongated, resilient fingers rigidly mounted on each rod respectively and spaced longitudinally along the latter, said fingers extending outwardly from the rods in substantially radial, normal relationship to the axle.

2. In a crop handling implement, a mobile frame; an elongated cutter bar operatively carried by the frame; a pair of elongated arms; means pivotally mounting the arms adjacent one end thereof upon the frame for swinging movement about a common horizontal axis parallel to the length of the cutter bar, said arms being disposed in spaced, longitudinal parallelism to each other; an elongated axle extending between and rotatably journalled in the arms adjacent the opposite ends of the latter, said axle having its longitudinal axis parallel to said axis of swinging movement of the arms; a pair of spaced, circular, end plates rigidly mounted on the axle adjacent its ends; a plurality of elongated rods extending between and rigidly interconnecting said plates, said rods being disposed in a circle about said axle in parallelism with each other and the axle; a plurality of elongated, resilient fingers rigidly mounted on each rod respectively and spaced longitudinally along the latter, said fingers extending outwardly from the rods in substantially radial, normal relationship to the axle; and means on the frame for releasably holding the arms in alternative positions of swinging movement to render the axis of rotation of the axle adjustable relative to the cutter bar.

References Cited in the file of this patent

UNITED STATES PATENTS

| | | |
|---|---|---|
| 717,588 | Maloney et al. | Jan. 6, 1903 |
| 963,128 | Estes | July 5, 1910 |
| 1,190,939 | Motte et al. | July 11, 1916 |
| 1,388,407 | Conklin | Aug. 23, 1921 |
| 1,915,401 | Braasch | June 27, 1933 |
| 2,212,465 | Baldwin | Aug. 20, 1940 |
| 2,513,111 | Schiller | June 27, 1950 |
| 2,554,195 | Jones | May 22, 1951 |
| 2,596,641 | Bert et al. | May 13, 1952 |

FOREIGN PATENTS

| | | |
|---|---|---|
| 99,463 | Germany | Sept. 29, 1898 |